No. 784,132.

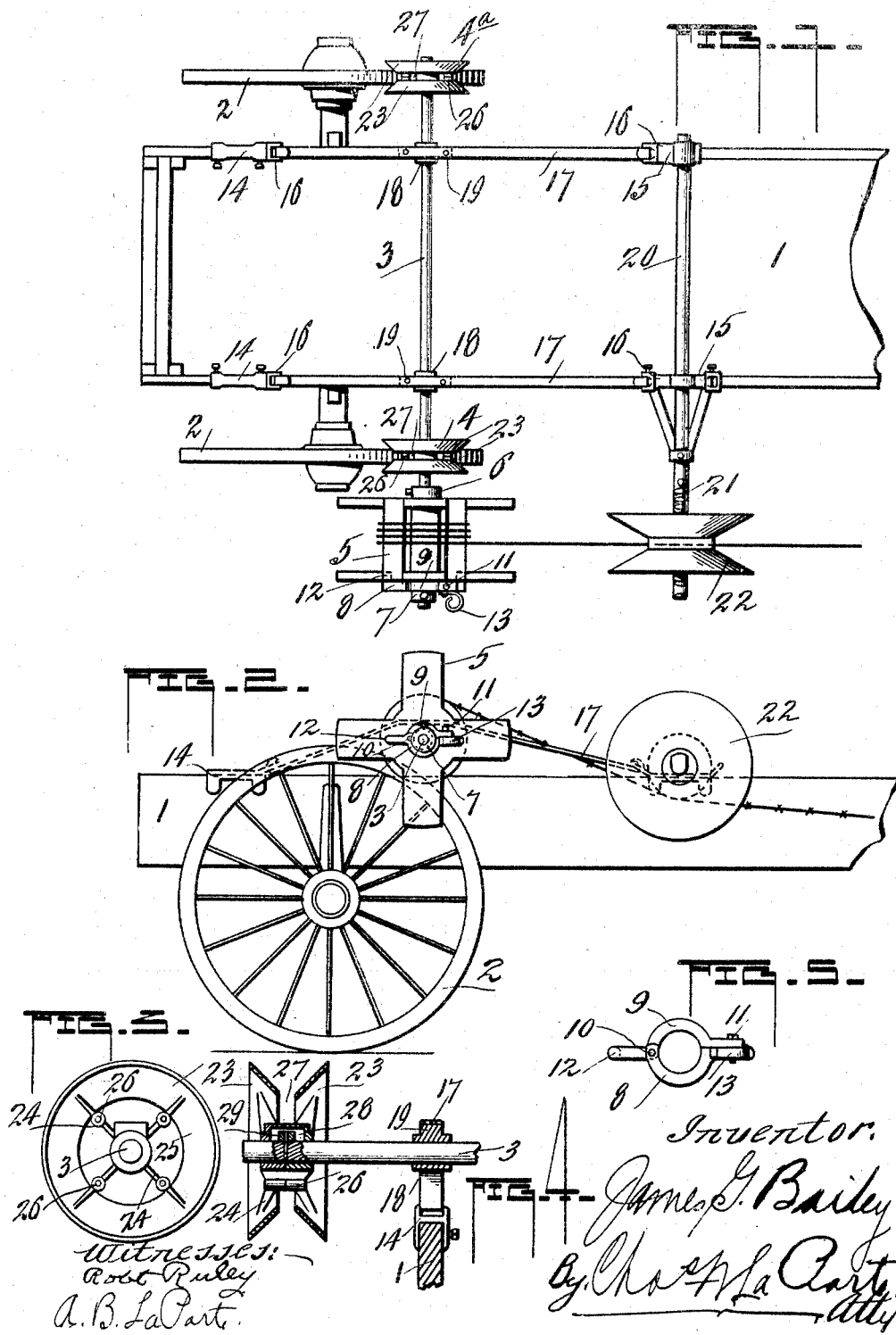

Patented March 7, 1905.

UNITED STATES PATENT OFFICE.

JAMES G. BAILEY, OF DELAVAN, ILLINOIS.

WIRE REELER AND UNREELER.

SPECIFICATION forming part of Letters Patent No. 784,132, dated March 7, 1905.

Application filed December 4, 1903. Renewed August 9, 1904. Serial No. 220,073.

*To all whom it may concern:*

Be it known that I, JAMES G. BAILEY, a citizen of the United States, residing at Delavan, in the county of Tazewell and State of Illinois, have invented certain new and useful Improvements in Wire Reelers and Unreelers; and I do hereby declare that the following is a full, clear, and exact description of the invention, which will enable others skilled in the art to which it appertains to make and use the same.

This invention has reference to a machine for reeling and unreeling wire, smooth or barbed.

The invention has for its further object a friction-drive for the reel coacting with two wheels of a vehicle, springs flexibly holding a frictional relation between the drive and vehicle wheels, and in the provision of means whereby the frictionally-driven devices may at all times accommodate their positions to the surface of the wheels which drive the same.

A further object of the invention consists in the means for retaining the spool on its shaft, for fixedly securing the same when reeling, and for frictionally retaining it in position on its shaft when designed for the purpose of unreeling wire.

The invention consists in other and various details of construction and arrangement hereinafter more fully understood, reference being had to the accompanying drawings, forming a part of this specification, in which—

Figure 1 is a plan view of the device as attached to an ordinary wagon. Fig. 2 is a side elevation of the same. Fig. 3 is an elevation of one of the friction-wheels, and Fig. 4 is a cross-section through the friction-wheel shown in Fig. 3. Fig. 5 is a detail, enlarged, showing device for holding reel detached.

In the drawings, 1 indicates a vehicle-body, having the ground-wheels 2, (only the rear portion of the wagon being shown.)

3 indicates a cross-shaft mounted transversely above the vehicle-bed and carrying the friction-power wheels 4 4$^a$, frictionally engaging the wheels 2 of the vehicle in manner shown, and upon one end of said shaft and outside of the friction-wheel 4 is carried a reel 5, held in place on the shaft by the collars 6 and 7, the latter being in the form of a grooved sleeve, over which are clamped the members or semicircular rings 8 and 9, pivoted together at 10 and secured at 11 by a nut or pin, which when released permits the parts to be swung on their pivot 10 and separated to adapt their removal from the collar 7. Extensions are made from the members which have the laterally-disposed studs or pins 12, adapted to engage sockets in the frame of the reel for causing it to rotate with the shaft as the same is turned by the action of the friction-wheels against the ground-wheels of the vehicle. The collar 7 is secured to the shaft 3, and locking the members to the collar in manner specified secures the same to the shaft. On the member 8 is shown attached a spring 13 in the form of a half-coil extending laterally from the face of its carrying member. In Figs. 1 and 2 the studs 12 engage sockets in the reel-frame, which causes the same to be rotatably fixed with the shaft, as described, this arrangement being designed for the purpose of reeling up wire. For unreeling, the reel is carried by the shaft to rotate freely thereon, and to do this I invert or reverse the members 8 and 9, so as to cause the spring 13 to bear against the frame of the reel. Thus it will be seen that there will be sufficient friction engagement between the spring and the reel to prevent the latter turning too freely on its shaft when unreeling wire from the spool, for which purpose the spring on the member 8 is provided.

14 and 15 refer to suitable castings attached to the sides of the vehicle-bed and each provided with loops 16, and 17 represents duplicate flat springs having their free ends attached to the loops 16 of the castings 14 and 15, and the said springs are arched to bear over the shaft 3 for the purpose of flexibly retaining the power-wheels 4 4$^a$ in frictional relation with the vehicle-wheels for driving the shaft 3.

18 represents collars through which the shaft 3 extends and are provided with the upper flat faces 19, and the springs 17, bearing over these collars, are riveted or otherwise suitably secured to the same.

The castings 15 are each provided with bearings in which is fixed a rod 20, having an extension 21, provided with a right and left thread, and mounted to revolve and yet be reciprocated on said rod is a wire guide 22, with suitable devices within itself (not shown) engaging the threads, whereby as the wire is being fed to the reel it will engage the under side of the guide 22, which will cause the same to rotate and automatically shift itself, which in turn will cause the wire to be wound evenly on the reel, all of which it is believed is understood.

It is designed that the power-wheel 4 will be fixedly carried on the shaft 3, and any wabble or uneven running of the vehicle-wheel will shift the friction-wheel 4 and cause a corresponding shifting movement of the shaft 3, which slides through the collars 18; but the friction-wheel 4ª is so mounted on the shaft 3 that the shaft may reciprocate to a greater or less extent without effecting the position of the drive 4ª, yet at the same time the drive 4ª will accommodate itself to any wabble or unevenness of the vehicle-wheel with which it engages and impart power to the shaft 3. This arrangement is necessary, as the movements of both wheels of the vehicle will seldom correspond, and this provision is made to prevent binding of the wheels. Each of the power-wheels 4 4ª is composed of the bevel-disks 23, having the web portions 24, leaving open ways 25 in the body of the disks, and 26 represents studded extensions whereby the disks may be secured together and yet leave the annular open way 27 between their matching faces. This arrangement will permit dirt and mud cut from the vehicle-wheels by the disks to slip between the faces of the disks and crowd out through the open ways 25 of the same; but the wheel 4ª differs from the wheel 4 in that the sections of its hub are provided with chambered portions 28, as shown, which incloses a roller 29, secured to the shaft, so that when the disks of the wheel are joined they appear as in Fig. 4, the rotation of the wheel being imparted to the shaft 3 by engagement of the hub thereof with the roller 29, and yet the shaft and wheel are free to reciprocate independent of each other for the purposes above set forth.

What I claim is—

1. In a wire reeler and unreeler, the combination with a vehicle, of a shaft carrying a spool, friction-wheels upon the opposite ends of said shaft-engaging wheels of the vehicle, one of said friction-wheels fixed on the shaft, the opposite friction-wheel while rotatable with its shaft being capable of longitudinal movement to automatically adjust itself to any lateral movement of the wheel with which it engages, substantially for the purposes set forth.

2. In a wire reeler and unreeler, the combination with a vehicle, of a shaft mounted transversely on the vehicle-bed and carrying a spool, two friction-wheels engaging wheels of the vehicle and carried by said shaft, each comprising two separate disks secured together, leaving an annular space between their faces and having open ways in their bodies, one of said friction-wheels fixed on the shaft, the other, while rotatable with its shaft being capable of longitudinal movement to automatically adjust itself to any lateral movement of the wheel with which it engages, substantially for the purposes set forth.

3. In a device of the class described, the combination of driving-wheels, a driven shaft carrying a spool, friction-wheels carried by said driven shaft and adapted to contact with the driving-wheels, one friction-wheel fixed on the shaft, the other slidable upon or with the shaft, having a chambered hub portion, a roller secured to the driven shaft and located within the chambered hub of the wheel aforesaid adapted to impart rotary motion to the shaft when the wheel is turned by engagement of the hub therewith and to facilitate in the lateral movement of said wheel or its shaft, substantially as specified and for the purposes set forth.

4. In a wire reeler and unreeler, the combination with a vehicle, of a shaft mounted transversely upon the vehicle, and slidable in collars supported by and held under tension of springs having their ends attached to means from the vehicle-bed, friction-wheels carried upon opposite ends of said shaft, each engaging ground-wheels of the vehicle, one fixed on the shaft and the other revolubly carried with the same and slidable thereon, substantially as set forth.

5. In a wire reeler and unreeler, the combination of a shaft, a reel carried thereby, interchangeable means for securing the reel to turn with its shaft for reeling, and for frictionally engaging the reel-frame to permit the reel to rotate independent of its shaft when unreeling, substantially as specified.

6. In a wire reeler and unreeler, the combination with a shaft, of a reel carried thereby, a collar on said shaft, two members pivotally connected to each other and adapted to be locked on said collar, having means for fixedly connecting the reel with the collar, and a spring carried by one of said members adapted when the members are reversed to frictionally hold the reel during its rotation, substantially as described.

7. In a wire reeler and unreeler, the combination with a vehicle, of a shaft carrying a reeling-spool, two friction-wheels carried on said shaft, one fixed to shift with the shaft and the other slidable upon or with the shaft, a collar on said shaft, two members pivotally connected to each other and adapted to be locked on said collar, having means for fixedly connecting the spool with the collar, and a spring carried by one of said members adapted when the members are reversed to frictionally hold the spool during its rotation, substantially as described.

In testimony whereof I affix my signature in presence of two witnesses.

JAMES G. BAILEY.

Witnesses:
CHAS. W. LA PORTE,
ROBT. RULEY.